May 29, 1951 F. B. PFEIFFER 2,554,636
WRAPPING METHOD
Original Filed Nov. 6, 1945 2 Sheets-Sheet 2
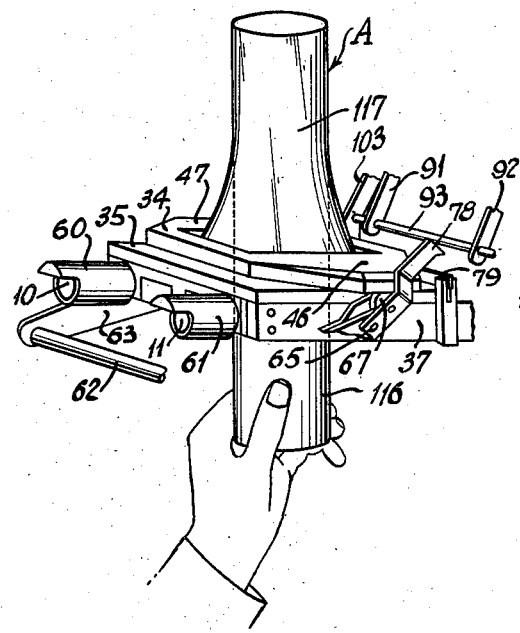
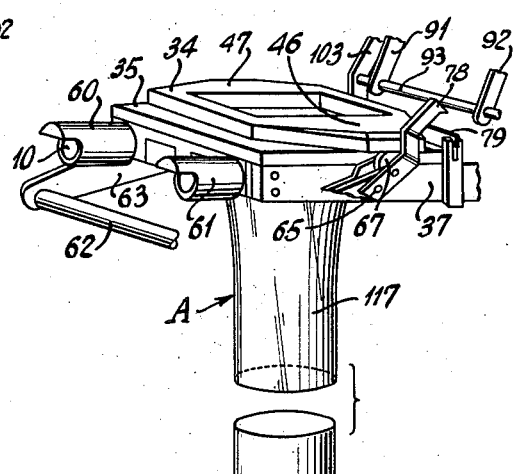
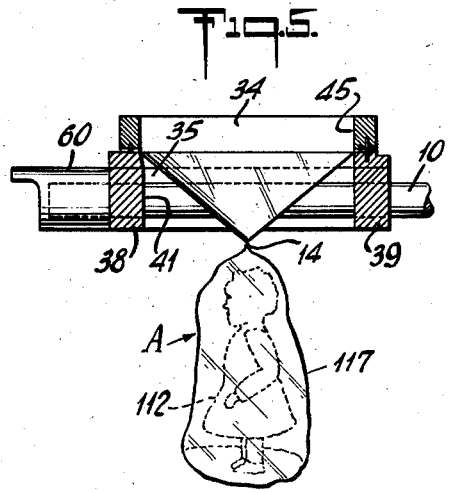
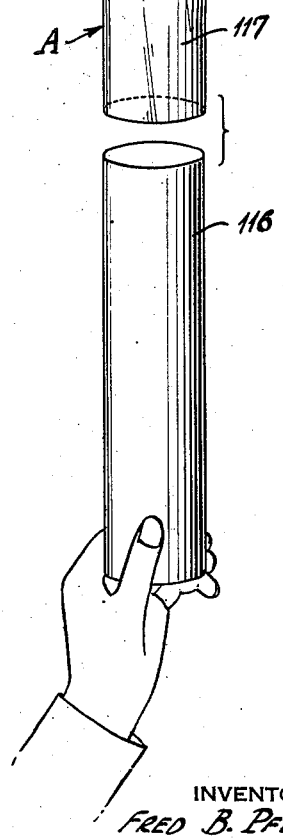
INVENTOR
FRED B. PFEIFFER.
BY
ATTORNEYS Patented May 29, 1951

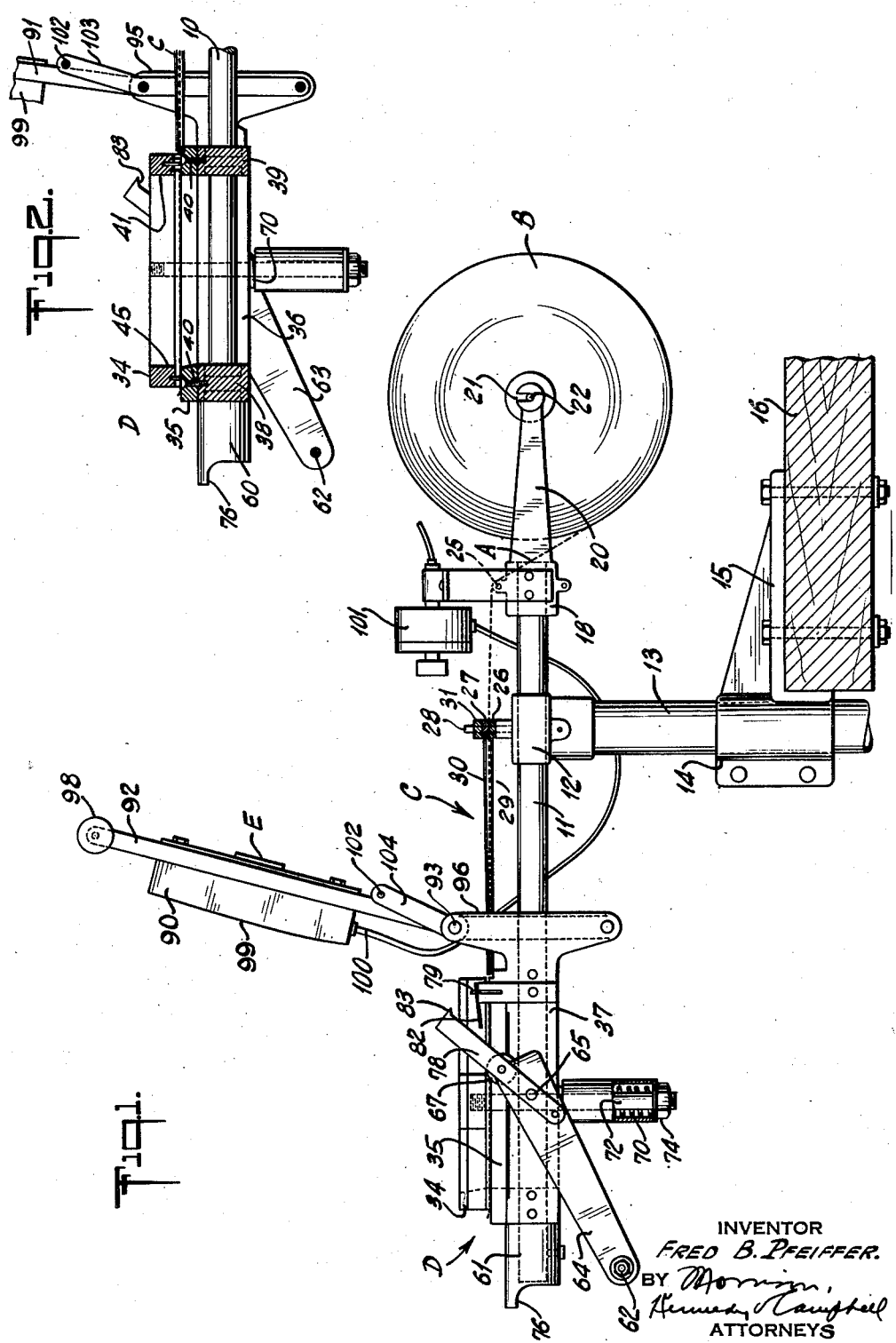

2,554,636

UNITED STATES PATENT OFFICE 2,554,636

WRAPPING METHOD

Fred B. Pfeiffer, Akron, Ohio

Original application November 6, 1945, Serial No. 627,062. Divided and this application May 13, 1949, Serial No. 93,111

7 Claims. (Cl. 18—56)

This invention relates to an improved method of wrapping articles and carries forward the broad inventive concept disclosed in a copending application Serial No. 193,214, filed February 28, 1938, now Patent 2,486,758 issued November 1, 1949, although the present application is a division of another copending application Serial No. 627,062, filed November 6, 1945, now Patent 2,486,762 issued November 1, 1949.

The invention especially contemplates wrapping, either partly or completely, various objects with a film or sheet of such a nature as to be capable of readily conforming to any desired shape to accommodate the object or article or material being wrapped, and of either hugging the object or article tightly or enclosing it loosely as may be preferred. In some practices of the invention such film or sheet material is preferably moisture proof and impermeable to air or other gases and heat sealable, that is, capable of having engaging portions fused together when heated. One such material which is suitable for practicing the invention and which is commercially available is a rubber hydrohalide, more specifically a rubber hydrochloride, manufactured by the Goodyear Tire & Rubber Company of Akron, Ohio, under the trade name of "Pliofilm," such material being more specifically described in the Calvert Patent No. 1,989,632 of January 29, 1935.

One feature of the invention contemplates supporting and holding edge portions of an appropriate piece of the wrapping material, softening the material by heat, and thereafter molding it to the desired shape with the aid of a preforming device. The molding just referred to may be accomplished by thrusting the preforming device into, through and beyond the plane of the wrapping material which is being held for this purpose, and thereafter removing said preforming device by retracting it through and beyond the original plane of the so held sheet, and causing the stretched portion of the sheet material to be turned inside out to form a sack by contact with the preforming device as the latter is retracted. This operation results in stretching the mid-portion of the film or sheet, the amount of stretch being selective according to the particular articles or materials being wrapped.

Another feature of the invention resides in twisting the stretched film or sheet after the object or material has been placed into the formed sack and while the edge portions are still being held, whereby to cause the film or sheet to completely surround and enclose the object or material.

One form of apparatus for practicing the invention is fully shown and described in the aforementioned parent application 627,062 (to which reference may be had if desired) and comprises a clamping device for holding edge portions of a piece of film or sheet material, said clamping means permitting free access to and through the mid-portion of the film. The clamping means furthermore are adapted to alternately engage and disengage the film or sheet material and to function in conjunction with means for presenting the film or sheet material in either strip or blank form. The clamping means also serve as feeding means for the material, although obviously said material may be otherwise supplied to the wrapping position or station. When the material is used in strip form, it may be severed at appropriate intervals in its length either before or after the wrapping operation, and this severing may be accomplished either manually or automatically as desired.

In the accompanying drawings:

Fig. 1 is a side elevation of a suitable wrapping apparatus for practicing the novel method;

Fig. 2 is a vertical longitudinal section taken through the clamping mechanism and showing a blank of Pliofilm anchored around its edge portions and ready for the wrapping operation;

Fig. 3 is a perspective view of the clamping mechanism showing the Pliofilm blank as being stretched upwardly into the form of a pocket by the preforming device;

Fig. 4 is a similar perspective view showing the pocket turned inside out by the downward withdrawal and removal of the preforming device; and Fig. 5 is a vertical longitudinal section taken through the clamping device and showing the pocket closed and sealed at its upper end after the object to be wrapped has been placed therein.

Referring now to the drawings, it will be seen that the sheet wrapping material A, such as that previously referred to as "Pliofilm," is drawn in strip form from a stockroll B through suitable guide means C to a clamping mechanism which is designated generally by the letter D. This clamping mechanism D is characterized by a central opening within which or over which the sheet material A is adapted to be held taut, as shown in Fig. 2. While the sheet is thus held taut, it is heated quickly by a suitable heater E and immediately thereafter a preforming device 116 is thrust or projected against the so-held and heated sheet in such a way as to deform and stretch portions of the sheet, whereby partly to conform it to the shape of the object to be wrapped. The extent of stretching to which the sheet material is thus subjected may vary as desired for the wrapping of different objects. At any rate, the shaping of the sheet material is commenced by pushing the preforming device 116 to and beyond the plane of the clamped sheet, as shown in Fig. 3, and then retracting the preforming device through and beyond the original plane of the clamped sheet, thereby causing the stretched portion of the sheet to be turned inside out by contact with the preforming device, as the latter is retracted, to form a pocket or sack 117, as shown in Fig. 4. The object 112 which is to be wrapped (a doll with hair is shown by way of illustration) may then be dropped into the pocket or sack 117 and held in place until the film or sheet has cooled or become set in its stretched condition. If desired, a blast of cooling air may be used to hasten the setting. When it is desired to completely enclose the object, it and the partly formed sheet may be instantly (without waiting for the sheet to cool) grasped either by hand or otherwise and turned in such a way as to impart a contracting twist 114 to remaining portions of the sheet, as shown for example in Fig. 5. This contracting twist may be accomplished by a relatively rotary movement between the object being wrapped and the clamping means, or may be accomplished by turning the object itself in reference to the clamping means, or by turning the clamping means while holding the object and the partly formed sheet, or by turning both the object and the clamping means relative to each other. The heating which has previously been referred to must be sufficient to soften the sheet material to enable it to stretch as desired. The exact degree of heat which is applied may vary within certain limits according to the properties of the sheet and the amount of stretch necessary for wrapping any specific article. In some cases, the heat necessary to render the sheet stretchable may be supplied by the preforming device, although more preferably such heat will be supplied by any one of several extraneous heating devices. Any or all of the method steps referred to above may be carried out manually or automatically as desired.

The clamping mechanism D is mounted upon a reciprocating carriage which is slidably supported on a pair of substantially horizontal frame bars or rods 10 and 11 which are spaced from each other and parallel. These frame bars or rods 10 and 11 are secured in a substantially T-shaped bracket 12 which is secured upon the upper end of a standard 13, which in turn is adjustably clamped as at 14, in a mounting bracket 15 by means of which the assembly may be appropriately secured to a bench top, table or the like indicated at 16. In addition to being adjustable upwardly and downwardly in the bracket portion 14, the standard 13 may also be rotatably adjustable about its own axis.

Adjacent their inward or rearward ends, the frame bars or rods 10 and 11 are rigidly connected together by a cross member 18 to which are secured, as best shown in Fig. 1, a pair of arms 20 which project rearwardly and are formed with slots 21 for receiving a rod 22 about which the stock supply roll B is rotatable. Coiled compression springs or some similar means may be disposed between the ends of the stock supply roll B and the adjacent surfaces of the supporting arms 20 whereby to substantially center the stock supply roll and at the same time to impose upon the roll a slight frictional drag to prevent slackness in the sheet or strip drawn from the stock roll. A guide rod 25 is supported above the cross member 18 and constitutes the first guide with which the sheet material A comes in contact in its passage from the stock roll to the clamping means.

Directly over the frame bracket 12, there are mounted a pair of substantially straight flat bars 26 and 27, one above the other, they being held in place by a pair of dowel pins 28 which are carried adjacent the opposite ends of said frame member 12. The lower bar 26 is provided at its forward edge with a plurality of guide wires 29 slightly bent upward so that their outward or forward ends substantially come into the plane of the meeting faces of the bars 26 and 27. Similarly, the forward edge of the upper bar 27 is provided with wires 30 slightly bent downward so that their outward or forward ends substantially meet the plane of the meeting faces of bars 26 and 27. The purpose of this arrangement is to give further support and guidance to the sheet material A as it passes from the first guide rod 25 to the clamping mechanism, and also to assist in tensioning the sheet so that it may best be presented to the clamping means. As shown in Fig. 1, the sheet A passes between the bars 26 and 27 and between the wires 29 and 30. The arrangement is such that the bar 27 actually rests upon the passing sheet A, and if desired an additional weight 31 may rest upon the upper side of the bar 27. This arrangement prevents reverse movement of the film or sheet material A during part of the movement of the carriage, as will later be explained.

The clamping mechanism D includes an upper plate 34 and a lower plate 35 which are mounted upon and movable with the reciprocating carriage previously mentioned. This carriage may be formed as a single casting if desired or it may be assembled of several separate parts, as for example a pair of side members 36 and 37 connected by a pair of transverse end members 38 and 39, in rectangular arrangement. The members 38 and 39 are appropriately bored, reamed or otherwise formed with openings (see Fig. 2) having sliding fit on the frame rods 10 and 11. Incidentally, it is to be noted that the distance between the carriage members 38 and 39 in the one direction and the distance between the frame rods 10 and 11 in the other direction are sufficient to permit ready passage therebetween of an object to be wrapped and in some cases these dimensions will be sufficient to permit free passage of an operator's hand. The lower clamping plate or bed plate 35 may be removably secured to the carriage members 36, 37, 38 and 39 as by screws 40 or other appropriate fastening means. The lower plate 35 has a substantial central opening 41 to permit passage of the object being wrapped, this opening being shown substantially square but it may be otherwise shaped or proportioned dependent upon the size, shape and number of objects being wrapped.

The upper plate 34, like the lower plate 35, is characterized by a substantial central opening 45 which is adapted to overlie the opening 41. Preferably this upper plate is substantially octagonal in outline and has its opposite side portions 46 and 47 extending beyond the corresponding edges of the lower plate 35 when assembled (see Figs. 3 and 4). Around the opening 45, the plate 34 has imbedded in its lower surface a plurality of relatively thin blades which project edgewise a slight distance from the surface of the plate and are adapted for actual clamping contact against the sheet material on the lower plate 35, as shown in Figs. 2 and 5. By reason of these thin edges on the insert blades, clamping pressure is concentrated most effectively on the film to hold the same taut across the openings 41 and 45 and between the plates 34 and 35.

As previously stated, the carriage and associated parts may be reciprocated on the frame bars or rods 10 and 11, the rearward movement being limited by the bracket 12, and the forward movement being limited by a pair of adjustable collars 60 and 61 which are respectively secured to the outer or forward ends of the rods 10 and 11. The distance between the bracket 12 and the bushings 60 and 61 is definitely set according to the size of the openings 41 and 45 and the amount of sheet material which it is desired to feed to the wrapping position during each cycle of operation. The reciprocation of the carriage together with the raising and lowering of upper plate 34 are effected by a single manual control in the illustrated embodiment. For this purpose, a handle 62 extends transversely between the ends of a pair of levers 63 and 64, said levers being fulcrummed at 65 to the carriage side members 36 and 37. The inner or rearward ends of the levers 63 and 65 may be bifurcated for accommodation of elevating rollers 67 which are adapted to engage against the lower surfaces of the projecting portions 46 and 47 of upper clamping plate 34. As the handle 62 is pushed downwardly and rearwardly about the fulcrum point at 65, the rollers 67 and 68 will be moved to the uppermost point in their arcuate path and will correspondingly raise the upper clamping plate 34 sufficiently to disengage the clamping blades from the top surface of the plate 35 or from any film or sheet that might be lying on said plate at the time. This upward movement of plate 34 is resisted by coiled compression springs 70 surrounding the lowermost ends of dowels or guide pins 72 which are secured to the upper plate 34 and have close sliding fit in the lower plate 35 and the underlying portions of the carriage side members 36 and 37. The pressure exerted by the springs 70 augments the weight of the plate 34 to effect the clamping action and such pressure may be varied as desired through the medium of adjusting nuts 74.

After the upper clamping plate 34 has been elevated as has just been described, continued movement rearward of the handle 62 slides the carriage and its associated parts rearward until such movement is stopped by the bracket 12 and by such movement the film or sheet A, which has previously been threaded through the guide means to rest between the guide wires 29 and 30, becomes positioned between the plates 34 and 35. The manual force exerted on the handle again swings upwardly, causing the weight of plate 34 and the force of the springs 70 to press the edges of the clamping blades tightly against the so positioned film or sheet A. Thereafter, a forward pull on the handle 62 returns the carriage and associated parts to the position shown in Figs. 1 and 2, drawing the sheet or film with it and unwinding a corresponding amount thereof from the stock roll B. The film or sheet, held taut by the clamping means, is now in the wrapping position.

As the carriage reaches the forward limit of its movement by abutment against the ends of the collars 60 and 61, the handle 62 may be additionally drawn upward against shoulders 76 on the forward ends of said collars 60 and 61. As this is done, a pair of extension arms 78, which are respectively carried by the levers 63 and 64, are swung downwardly against a cutter bar or knife blade 79 which normally rests within a groove in the upper plate 34. The lower edge of the cutter bar or knife blade 79 is appropriately sharpened over a distance greater than the width of the sheet material A so that, when it is driven downward by the extension arms 78, it will sever the film or sheet on a corresponding line, leaving a clamped blank of such material at the wrapping position and leaving the remainder of the material in position for presentation to the clamping means in the next cycle of operation. The cutter bar or knife blade 79 is normally urged upward by resilient wire springs 82 (best shown in Fig. 1), said springs being anchored in or carried by the plate 34. To facilitate actuation of the knife blade, the outer ends of the extension arms 77 and 78 are formed with offset portions 83 which actually engage the knife blade. Preferably the knife blade 79 commences to cut the film or sheet at one edge and then cuts progressively across the sheet. This may be accomplished either by having an inclined cutting edge on the knife blade 79 or by inclining the blade as a whole, having one of the extension arms 78 strike the knife blade slightly in advance of the other.

While the severed blank of sheet material is held in the clamping means D, heat may be supplied from the heating means E. In the illustrated embodiment, the heating means E comprises a heat conducting box 90 which is carried between a pair of spaced arms 91 and 92 which are pivotally mounted on a transverse rod 93 disposed between extensions 95 and 96 of the carriage side members 36 and 37. At their outer ends, the arms 91 and 92 are provided with hand grips 98 by means of either of which the heating means may be moved into its heating position or to its inactive position shown in Fig. 1. The heat conducting box 90 may be formed of aluminum or other suitable material and preferably conforms to the shape of opening 45 in upper clamping plate 34 but slightly smaller than said opening to provide sufficient clearance for its insertion and its withdrawal. The operative face 99 of this heating box 90 is very slightly convex spherically and the arrangement is such that, when in heating position, this convex surface comes completely in contact with the clamped film or sheet and actually pushes the engaged portion of the film or sheet very slightly out of its original plane. In so contacting the film or sheet, there is no possibility of trapped air interfering with the uniform heating. Within the box 90 there is an appropriately insulated electric heating element of conventional type, said heating element being energized through flexible conducting wires 100 connected with an appropriate source of current supply through a controlling rheostat 101. By adjustment of the rheostat, the temperature to which the film or sheet is heated may be varied as desired for specific wrapping operations. When such film or sheet is of the type known as Pliofilm, excellent results for average packages may be obtained by heating to approximately within a range of from 290° F. to 330° F. When the heating unit is in its inactive position as shown in Fig. 1, the arms 91 and 92 rest against a crossbar 102 which is connected to the carriage extensions 95 and 96 by brackets 103 and 104.

After an article has been wrapped as previously described and as illustrated in Fig. 5, the handle 62 may be depressed sufficiently to raise the upper clamping plate 34 against the action of springs 70, whereby to release the clamped edges of the sheet material. As the package is removed from the machine, the edge portions of the sheet which have been held in the clamping means will quickly shrink and move close to the adjacent end of the package, appearing somewhat like a rosette. In case of some merchandise, this extra material may be left on, and in other cases it may be partly or almost entirely removed with the aid of scissors or the like. In case the extra material is thus removed and if it is desired to more completely seal the package or to more completely shrink the film or sheet on the package, the twisted and trimmed end may be momentarily held against or in close proximity with the heating surface 99 or against or in close proximity with some other appropriate heating surface.

From the method described, the packages will be quite snug with reference to the contained article. The degree of snugness or tightness and the extent to which the film or sheet conforms to the enclosed article may be varied to some extent by specific manipulation. Some of the factors which may be varied for this purpose are: (1) the area of the film or sheet in relation to the surface to be covered; (2) the degree of heat imparted to the film prior to stretching; (3) the distance of thrust beyond the initial clamped plane of the film or sheet; (4) the amount that the thrust-formed film or sheet is permitted to retract toward the original clamped plane just prior to or during the twisting operation; (5) the thickness of the initial film or sheet; (6) the time at which the clamped film edges are released with reference to completion of the package. Some of the variable factors enumerated above are dependent upon the properties of the specific material being used, while others are dependent upon the skill and dexterity of the operators.

In Figs. 3 and 4, the preforming device 116 is shown in solid and cylindrical form, although it is obvious that it could be otherwise. In this embodiment, the preforming device 116 may first be thrust upwardly against and beyond the clamped plane of heated film or sheet, causing said film or sheet to snugly embrace the inserted end of said device (Fig. 3). Thereafter, the device may be withdrawn downwardly and in such movement the engaging portion of the film or sheet will follow it and be reversed into a downwardly extending socket or recess, such as 117 (Fig. 4). In effect this forms a sack having integral sides and bottom and with an open top held ready for delivery or insertion of any desired material or article, such as 112. The final finishing of the wrapping and closing of the sack may be accomplished by a turning movement as previously described, that is to say, by grasping the sack with the article inside and rotating the two as a unit to produce a contracting twist, such as 114 (Fig. 5), or in any other way desired. Incidentally, it is to be noted that the sack-like formation of the film or sheet, as shown and described, is not limited to any particular kind of object but may actually be used to receive and to contain candies, nuts, granular materials such as salt, sugar, coffee or plastic or fluid materials. It will also be understood that, before filling the sack, it is not necessary to withdraw the preforming device completely; in fact, in some cases, it may be desirable to maintain the gripping contact between the preforming device and the lower closed end of the sack until after the sack has been filled and allowed to cool or until after the open end of the sack has been closed and sealed. The actual manipulation will depend somewhat upon the variable factors before mentioned.

Having thus described my invention, what I claim is:

1. In a method of wrapping with stretchable and sealable sheet material, the steps comprising holding edge portions of a sheet of such material in substantially taut condition, heating the central portion of such sheet material, thrusting a preforming device against and beyond the plane of the so-held sheet, removing said preforming device by retracting it through and beyond the original plane of the so-held sheet, and causing the stretched portion of said sheet material to be turned inside out to form a sack by contact with the preforming device as the latter is retracted, placing the contents to be wrapped in said sack, and finally closing and sealing the open end of the sack to complete the enclosure of the contents.

2. A wrapping method including the steps of providing a blank of heat-stretchable sheet material, anchoring said blank at its marginal portions, heating the blank to render it stretchable, thrusting the preforming device against and beyond the plane of the blank while so anchored to form a pocket therein and to make inside contact therewith, and then retracting the preforming device through and beyond the original plane of the blank while it is still so anchored to cause said preforming device, through its gripping contact with the inside of the pocket, to turn the pocket inside out and leave it open for the insertion of the desired contents.

3. A wrapping method including the steps of providing a blank of heat-stretchable and heat-sealable sheet material, anchoring said blank at its marginal portions, heating the blank to render it stretchable and sealable, thrusting a preforming device beyond the plane of the blank while so anchored to stretch the blank and cause it to make gripping contact with the preforming device, retracting the preforming device through and beyond the original plane of the blank while it is still so anchored to cause said preforming device, through its gripping contact with the blank, to form an open-ended pocket therein for the contents to be wrapped, placing the contents in said pocket, and finally closing and sealing the open end of the pocket.

4. A method according to claim 2 characterized in that the preforming device, after the pocket has been turned inside out, is maintained in outside contact therewith at its lower closed end to hold the blank in its stretched condition until it has become cooled and set in that condition.

5. A method according to claim 2 characterized in that the preforming device, after the pocket has been turned inside out, is maintained in outside contact therewith at its lower closed end to hold the blank in its stretched condition until the pocket has been filled.

6. A method according to claim 3 characterized in that the preforming device, after forming the pocket, is maintained in outside contact therewith at its lower closed end to hold the blank in its stretched condition until the open end of the pocket has been closed and sealed.

7. A method according to claim 2 characterized in that the heating of the blank is effected by the preforming device.

FRED B. PFEIFFER.

REFERENCES CITED

The following references are of record in the file of this patent:

UNITED STATES PATENTS

| Number | Name | Date |
| --- | --- | --- |
| 2,331,762 | Brown | Oct. 12, 1943 |
| 2,365,637 | Helwig | Dec. 19, 1944 |
| 2,468,697 | Wiley | Apr. 26, 1949 |